(12) United States Patent
Nagano

(10) Patent No.: US 7,355,184 B2
(45) Date of Patent: Apr. 8, 2008

(54) RADIATION DETECTING APPARATUS AND METHOD FOR MANUFACTURING THE SAME

(75) Inventor: Kazumi Nagano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/817,972

(22) Filed: Apr. 6, 2004

(65) Prior Publication Data

US 2004/0195514 A1 Oct. 7, 2004

(30) Foreign Application Priority Data

Apr. 7, 2003 (JP) ............................ 2003-102895

(51) Int. Cl.
*G01T 1/20* (2006.01)

(52) U.S. Cl. ................................. 250/370.11

(58) Field of Classification Search .......... 250/370.09, 250/370.11; 427/536, 69, 70, 65
See application file for complete search history.

(56) References Cited

U.S. PATENT DOCUMENTS

| | | | |
|---|---|---|---|
| 5,166,512 A * | 11/1992 | Kubo | 250/214 VT |
| 6,262,422 B1 | 7/2001 | Homme et al. | 250/370.11 |
| 6,278,118 B1 * | 8/2001 | Homme et al. | 250/370.11 |
| 6,350,844 B1 * | 2/2002 | Ono et al. | 528/170 |
| 6,469,305 B2 | 10/2002 | Takabayashi et al. | 250/361 |
| 6,469,307 B2 | 10/2002 | Takabayashi et al. | 250/370.11 |
| 6,476,395 B2 * | 11/2002 | Boerner et al. | 250/368 |
| 6,824,872 B2 * | 11/2004 | Coates et al. | 428/403 |
| 6,849,306 B2 * | 2/2005 | Fukuda et al. | 427/569 |
| 7,019,303 B2 * | 3/2006 | Homme et al. | 250/370.11 |
| 2002/0017613 A1 | 2/2002 | Homme et al. | 250/370.11 |
| 2003/0116281 A1 * | 6/2003 | Herbert et al. | 156/379.6 |
| 2003/0173493 A1 * | 9/2003 | Homme et al. | 250/200 |
| 2004/0000644 A1 * | 1/2004 | Homme | 250/361 R |
| 2004/0178350 A1 | 9/2004 | Nagano et al. | 250/370.11 |

OTHER PUBLICATIONS

Soma, M. et al. "Improvement of Adhesion Characteristics Using Atmospheric Pressure Plasma Processing." Matsushita Electric Works Technical Report, No. 79 (Nov. 2002), p. 61-66.*
Chung et al. "Atmospheric RF Plasma Effects on the Film Adhesion Property". Thin Solid Films, vol. 447-448 (Jan. 30, 2004), pp. 354-358.*
Translation of Soma, M. et al. "Improvement of Adhesion Characteristics Using Atmospheric Pressure Plasma Processing." Matsushita Electric Works Technical Report, No. 79 (Nov. 2002), p. 61-66.*
Matsushita Electrical Works New Technical Report, pp. 13 to 17 (Apr. 2000).

* cited by examiner

*Primary Examiner*—David Porta
*Assistant Examiner*—Mark R Gaworecki
(74) *Attorney, Agent, or Firm*—Fitzpatrick, Cella, Harper & Scinto

(57) ABSTRACT

An underlayer of a phosphor layer is disposed on a sensor panel including two-dimensionally arranged photoelectric conversion devices. The surface of the underlayer is subjected to atmospheric pressure plasma treatment. The phosphor layer is formed on the surface-treated underlayer. Then, the phosphor layer is covered with a moisture-resistant protective layer, a reflection layer, and another protective layer. Thus, the phosphor layer is prevented from peeling due to adhesion failure, and is constituted of uniformly shaped crystals by vapor deposition. A resulting radiation detecting apparatus exhibits high sensitivity and high definition, producing a uniform photoelectric conversion efficiency.

6 Claims, 3 Drawing Sheets

RADIATION DETECTING APPARATUS AND METHOD FOR MANUFACTURING THE SAME

BACKGROUND OF THE INVENTION

1. Field of the Invention

The present invention relates to a radiation detecting apparatus for detecting radiation, and in particular, a radiation apparatus used in medical apparatuses, non-destructive examination apparatuses, and the like, and to a method for manufacturing the same. The radiation herein includes α-rays, β-rays, and electromagnetic waves, such as X-rays and γ-rays.

2. Description of the Related Art

In the field of X-ray radiography, X-ray film systems have generally been applied which use a double-coated film and a fluorescent screen containing a phosphor layer. In addition, digital radiation detecting apparatuses have been used because they provide superior image characteristics and allow data to be captured into a networked computer system for sharing.

Among these digital radiation detecting apparatuses are high-sensitive, high-definition apparatuses, as disclosed in U.S. Pat. No. 6,262,422 and U.S. Pat. No. 6,469,305. Such radiation detecting apparatuses include: a photo-detector including two-dimensionally arranged photoelectric conversion devices, each conversion device including a photosensor and a thin-film transistor (TFT); and a phosphor layer for converting incident radiation into light capable of being sensed by the photoelectric conversion device. The two-dimensional photo-detector is covered with a protective layer for protecting the stiffness of the photoelectric conversion devices. In addition, moisture-resistant protective layers are provided between the phosphor layer and a reflection layer, and over the phosphor layer so as to cover the entire phosphor layer. A resin coat is further applied to the ends of the moisture-resistant protective layers. The moisture-resistant protective layers and resin coat prevent external water from permeating from the ends of the radiation detecting apparatus and enhance its durability.

The layers of the scintillator panel of a radiation detecting apparatus, such as a reflection layer, a protective layer, and an insulting layer, are formed of materials having largely different thermal expansion coefficients from each other. For example, amorphous carbon and glass have a thermal expansion coefficient in the range of 1 to $10 \times 10^{-6}/°$ C.; metals such as Al, in the range of 15 to $25 \times 10^{-6}/°$ C.; and common resins, in the range of 1 to $5 \times 10^{-5}/°$ C. Accordingly, the difference in displacement by a heat and humidity test among the layers is large. In order to enhance the durability of a radiation detecting apparatus, it is therefore important to increase adhesion between the layers so as to withstand displacement of each layer due to external influences, as well as to enhance moisture resistance. The above-described radiation detecting apparatuses have the following problems:

First, the phosphor layer may be broken or peeled from an underlayer, a protective layer of the phosphor layer overlying the photoelectric conversion devices, by a heat and humidity test because the adhesion between the phosphor layer and the underlayer is low.

Second, in connection with a corona discharge treatment, which is a common surface treatment for enhancing the adhesion of the underlayer to the phosphor layer, when the corona discharge treatment is applied to the underlayer overlying the photoelectric conversion devices of the sensor panel, current of the photoelectric conversion devices is likely to vary when the TFTs are in an off state, or when a wire of the photoelectric conversion devices is broken. Thus, it has been impossible to reform the surface of the underlayer without damaging the sensor panel.

An alternative to corona discharge treatment is vacuum plasma treatment, which produces the same results as corona discharge treatment. However, vacuum plasma treatment takes a long time and its process is complicated because it is performed under a high vacuum, and is thus undesirable.

SUMMARY OF THE INVENTION

Accordingly, an object of the present invention is to provide a high-sensitive, high-definition radiation detecting apparatus exhibiting uniform optical conversion efficiency whose phosphor layer is formed by vapor deposition so as to form uniform, highly precise columnar crystals and is prevented from peeling due to adhesion failure.

According to one aspect, the present invention manufactures a radiation detecting apparatus by applying atmospheric pressure plasma treatment to a surface of an underlayer which is provided on the sensor panel, and forming a phosphor layer on the surface of the underlayer.

In another aspect, the present invention manufactures a radiation detecting apparatus by forming an underlayer over a substrate and applying atmospheric pressure plasma treatment to a surface of the underlayer, forming the phosphor layer on the surface of the underlayer to prepare a scintillator panel, and bonding a sensor panel including two-dimensionally arranged photoelectric conversion devices to the scintillator panel.

In yet another aspect of the present invention, a radiation detecting apparatus comprises a sensor panel having two-dimensionally arranged photoelectric conversion devices, an underlayer disposed on the sensor panel, wherein the underlayer has a surface subjected to atmospheric pressure plasma treatment, and a phosphor layer disposed on the underlayer. Preferably, the radiation detecting apparatus further comprises a moisture-resistant protective layer between the phosphor layer and a reflection layer. The moisture-resistant protective layer prevents constituents and water in the phosphor layer from negatively affecting the reflection layer. Preferably, another protective layer is provided on the reflection layer so as to cover the entirety of the phosphor layer, and to protect the phosphor layer and the reflection layer from external water. Furthermore, the ends of these protective layers are preferably covered with a resin coat to prevent water from permeating from the ends of the radiation detecting apparatus.

In yet another aspect of the present invention, a radiation detecting apparatus includes a sensor panel having the two-dimensionally arranged photoelectric conversion devices and a scintillator panel having a phosphor layer lying on a surface of an underlayer subjected to atmospheric pressure plasma treatment. The sensor panel and the scintillator panel are bonded together with an adhesion layer.

In yet another aspect, the present invention manufactures a scintillator panel by applying atmospheric pressure plasma treatment to a surface of an underlayer which is provided over a substrate, and forming a phosphor layer on the underlayer. The scintillator panel includes the phosphor layer on the surface of the underlayer subjected to atmospheric pressure plasma treatment over the substrate.

Preferably, the surface of the underlayer subjected to the atmospheric pressure plasma treatment has a surface energy of $45\times10^{-3}$ J/m$^2$ or more. A columnar crystalline phosphor is vapor-deposited on this underlayer to form the phosphor layer.

The present invention's use of atmospheric pressure plasma treatment on the underlayer of the phosphor layer enhances the adhesion of the underlayer to the phosphor layer, wherein the phosphor layer generally has a columnar crystalline structure formed on the underlayer by vapor deposition.

In vapor deposition, a phosphor is discharged in a gas form onto the surface of a substrate from a deposition source. The phosphor coming in contact with the surface is changed into a liquid form and fixed to the substrate in a solid form. The crystals of the phosphor growing in a columnar structure are unstable in the vicinity of the fixing surface and thus, the diameter of the columnar crystals is reduced. As the crystals grow, the columnar crystals tend to aggregate to a larger diameter.

Since the phosphor crystals are typically grown directly on a sensor panel, a small diameter of the columnar crystals at the sensor panel side decreases the amount of light from the upper portion of the phosphor and reduces the optical output of the resulting radiation detecting apparatus. The present invention's use of atmospheric pressure plasma treatment on the underlayer of the phosphor layer increases the wettability of the fixing surface to facilitate the spread of the crystals over the fixing surface. Thus, the diameter of the columnar crystals is increased in comparison with when plasma treatment is not applied. Accordingly, the area occupied by columnar crystals having a small diameter, which negatively affect optical output in the vicinity of the sensor panel, is reduced and a higher optical output is achieved.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

Embodiments of the present invention will now be described with reference to the drawings.

First Embodiment

Figure 1A:
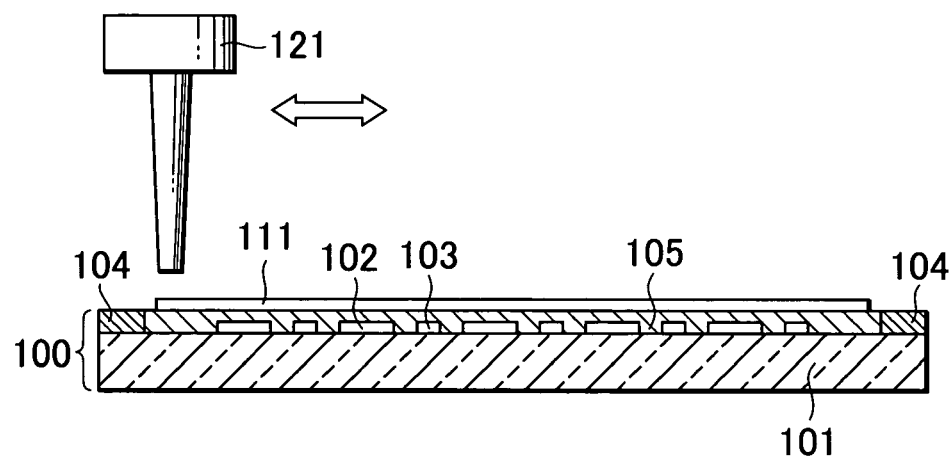
FIGS. 1A to 1C are sectional views showing the process steps for manufacturing a radiation detecting apparatus according to a first embodiment of the present invention.
Figure 1B:
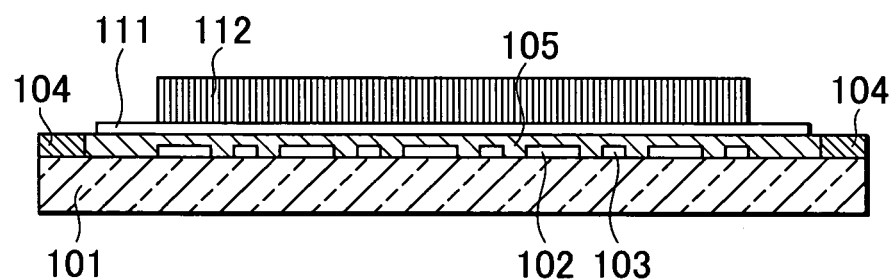
Figure 1C:
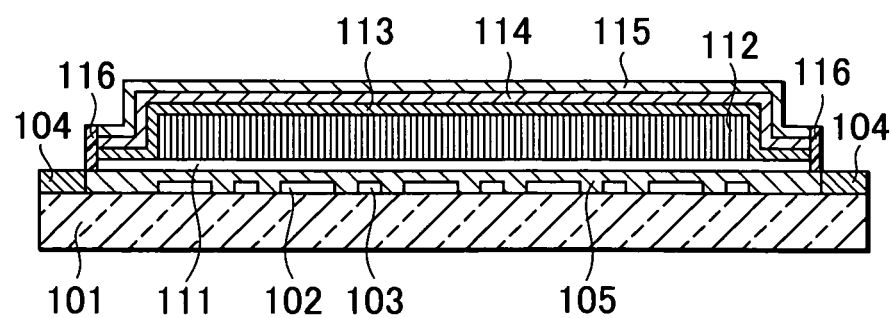

FIGS. 1A to 1C are sectional views showing the process steps for manufacturing a radiation detecting apparatus according to a first embodiment of the present invention.

As shown in FIG. 1A, a sensor panel 100 includes: an insulative glass substrate 101; photoelectric conversion devices 102, each including an amorphous silicon photosensor and a TFT; wires 103; lead-out portions 104; and a passivation layer 105 of, for example, silicon nitride, which is provided to cover the photoelectric conversion devices 102. A resin underlayer 111 of a phosphor layer 112 lies on the sensor panel 100. The underlayer 111 doubles as a protective layer for protecting the stiffness of the photoelectric conversion devices 102. The photoelectric conversion devices 102 are two-dimensionally arranged corresponding to pixels. The passivation layer 105 and the underlayer 111 may be referred to as a first protective layer and a second protective layer, respectively.

A surface of the underlayer 111 on the sensor panel 100 is subjected to atmospheric pressure plasma treatment. An apparatus used for performing such atmospheric pressure plasma treatment changes argon and oxygen gases into plasma gas, where the plasma gas is sprayed onto the surface from a nozzle 121 of the apparatus to clean and reform the surface, as published in Matsushita Electric Works Technical Report, Apr., 2000, pp. 13-17. In one example of the present invention, Aiplasma manufactured by Matsushita Electric Works was used as the atmospheric pressure plasma treatment apparatus.

Treatment conditions must be appropriately set according to the characteristics of the panel, in order to prevent damages to the photoelectric conversion devices and the wires. Preferably, the above-described treatment is performed at a power output of 0.9 kW and a nozzle speed in the range of 10 to 150 mm/s, ideally 30 to 120 mm/s. Atmospheric pressure plasma treatment under such conditions gives the surface of the underlayer 111 a surface energy of at least $45\times10^{-3}$ J/m$^2$. The surface energy is determined by a wettability test in accordance with JIS K 6768:1999 (Japanese Industrial Standard K 6768. publication date Oct. 31, 1999). A nozzle speed of less than 10 mm/s is likely to damage the sensor panel, due to increased noise and chance of defect. A nozzle speed of less than 30 mm/s makes the surface of the underlayer 111 rough, consequently causing a defect in the phosphor layer 112, which is formed on the underlayer 111 in a subsequent step. In contrast, a nozzle speed of more than 120 mm/s does not give the underlayer 111 sufficient surface energy. In order to enhance the adhesion between the phosphor layer 112 and the underlayer 111, the end portions of the underlayer 111, which are particularly subjected to peeling stress, are surface-treated. Thus, an adhesion strength sufficient to reduce defects is obtained. Otherwise, the end portions of the phosphor layer 112, which are formed by vapor deposition and are thin and unstable, are likely to peel due to stress from each layer in an endurance test. It is therefore preferable that the end areas within 5 mm or more from the edges of the underlayer be surface-treated. In particular, atmospheric pressure plasma treatment can be applied to a delimited region. Preferably, how the treatment is applied is based upon the delimited region. For example, only the end portions may be treated, or treatment conditions for the end portions may be changed to enhance the adhesion there. The treatment of the underlayer allows a deposited phosphor to spread stably over the landing surface. Consequently, the phosphor forms columnar crystals with a larger diameter in the vicinity of the sensor panel 100 in comparison with when treatment is not applied and thus, optical output is enhanced. It is therefore preferable that the underlayer 111 be subjected to the treatment over the entire surface (see FIG. 1A).

Turning to FIG. 1B, an alkali halide columnar crystalline phosphor (for example, CsI:Tl, thallium-activated cesium iodide) is vapor-deposited on the underlayer 111 to form a phosphor layer 112. The entire top and side surfaces of the phosphor layer 112 are covered with a moisture-resistant protective layer 113 and further a reflection layer 114, as shown in FIG. 1C. By providing the moisture-resistant protective layer 113 between the phosphor layer 112 and the reflection layer 114, the reflection layer 114 is prevented from being negatively affected by the constituents and water in the phosphor layer 112. Then, another protective layer 115 is provided to cover the entire reflection layer 114, and the ends of all the protective layers are covered with a sealing resin 116. The protective layers and the sealing resin 116 prevent external water and the like from negatively affecting the reflection layer 114 and the phosphor layer 112.

In addition, a PET/Al foil/adhesive composite may be provided over the protective layer 115 to further enhance moisture-resistance.

In the present embodiment, the present invention produces the highest optical output when the columnar crystalline phosphor layer 112, whose optical output depends on the control of the state of the crystals, is vapor-deposited.

Exemplary material of the passivation layer 105 includes inorganic materials, such as SiN, $TiO_2$, LiF, $Al_2O_3$, and MgO; and resins, such as polyphenylene sulfide, fluorocarbon, poly(ether-ether-ketone), liquid crystal polymer, polyethernitrile, polysulfone, polyethersulfone, polyarylate, polyamide-imide, polyetherimide, polyimide, epoxy, and silicone. Since the passivation layer 105 transmits light converted in the phosphor layer 112 during radiation exposure, a material is preferable which has a high transmittance for the wavelength of light emitted from the phosphor layer 112.

The underlayer 111 may be formed of any material as long as it is resistant to heating at 200° C. or more for forming the phosphor layer 112. Exemplary underlayer materials include polyamide-imide, polyetherimide, polyimide, polyurea, benzocyclobutene, highly heat-resistant acrylic resin, epoxy resin, and silicone resin.

The reflection layer 114 is preferably formed of a metal with a high reflectance, such as Al, Ag, Cr, Cu, Ni, Ti, Mg, Rh, Pt, and Au.

The moisture-resistant protective layer 113 covering the entirety of the underlayer 111 and phosphor layer 112 may be formed of any material, as long as it can block moisture and protect the underlying layers. Preferably, a highly moisture-resistant organic material, such as poly(p-xylene), is deposited by CVD, as disclosed in U.S. Pat. No. 6,469,305. If the adhesion between the underlayer 111 and the moisture-resistant protective layer 113 is not sufficient, water in the air can permeate from their interface and cause, for example, the columnar crystalline CsI to deliquesce. However, when the above-described organic layer is used as the moisture-resistant protective layer 113, which comes in contact with the underlayer 111 in the periphery of the CsI phosphor layer, thus covering the structure in which the CsI layer is formed on the surface subjected to atmospheric pressure plasma treatment of the underlayer 111, the moisture resistance at the interface between the underlayer 111 and the moisture-resistant protective layer 113 is advantageously enhanced.

For the phosphor layer 112, an activator-added alkali halide is preferably used. In addition to above-described CsI:Tl, exemplary phosphors include Na-activated CsI (CsI: Na), Tl-activated NaI (NaI:Tl), Eu-activated LiI (LiI:Eu), and Tl-activated KI (KI:Tl).

The present embodiment has illustrated a radiation detecting apparatus including a photo-detector having photoelectric conversion devices formed on a glass substrate, each including an amorphous silicon photosensor and a TFT. However, the radiation detecting apparatus of the present invention may have the structure in which the underlayer and the phosphor layer lie over a semiconductor crystal substrate including two-dimensionally arranged imaging elements, such as CCD or CMOS sensors.

Second Embodiment

The radiation detecting apparatus of the present invention may include a sensor panel having two-dimensionally arranged photoelectric conversion devices and a scintillator panel that are bonded together. The scintillator panel includes an underlayer of a phosphor layer over a substrate, where the phosphor layer is in contact with the underlayer. The surface of the underlayer contacting the phosphor layer is subjected to atmospheric pressure plasma treatment. The adhesion of the underlayer to the phosphor layer can be enhanced, and the diameter of the columnar crystals in the phosphor layer can be controlled, in the same manner as when the underlayer on the sensor panel is surface-treated.

FIGS. 2A to 2D are sectional views showing process steps for manufacturing a radiation detecting apparatus according to a second embodiment of the present invention.

Figure 2A:
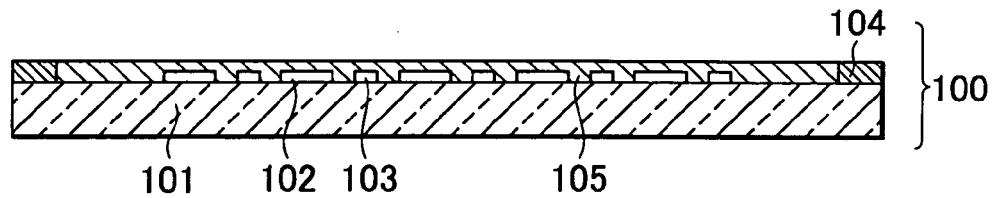
FIGS. 2A to 2D are sectional views showing the process steps for manufacturing a radiation detecting apparatus according to a second embodiment of the present invention.

FIG. 2A shows a sensor panel 100 of the radiation detecting apparatus. The sensor panel 100 includes an insulative glass substrate 101, photoelectric conversion devices 102, each including an amorphous silicon photosensor and a TFT, wires 103, lead-out portions 104, and a passivation layer 105 of, for example, silicon nitride.

Figure 2B:
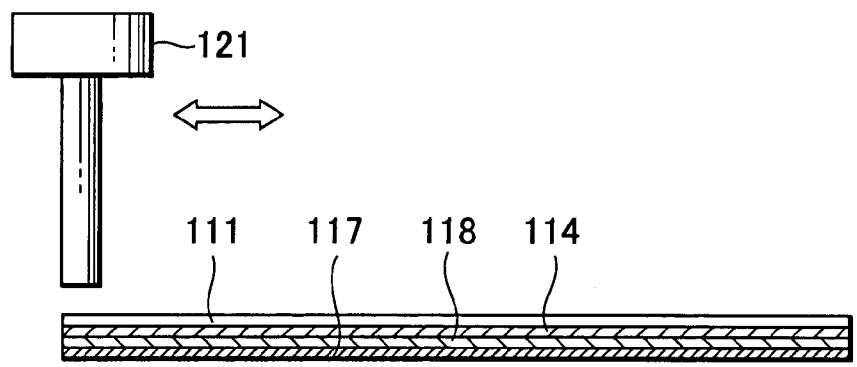
Figure 2C:
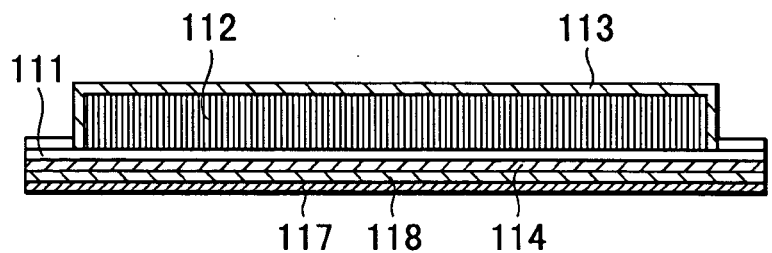

On the other hand, a protective layer 118, a reflection layer 114, and an underlayer 111 of a phosphor layer 112 are deposited in that order on a substrate 117, as shown in FIG. 2B. The underlayer 111 is surface-treated by the same atmospheric pressure plasma treatment as in the first embodiment. A columnar crystalline phosphor layer 112 is formed on the surface-treated underlayer 111, and covered with a moisture-resistant protective layer 113. Thus, a scintillator panel 110 is completed, as shown in FIG. 2C.

Figure 2D:
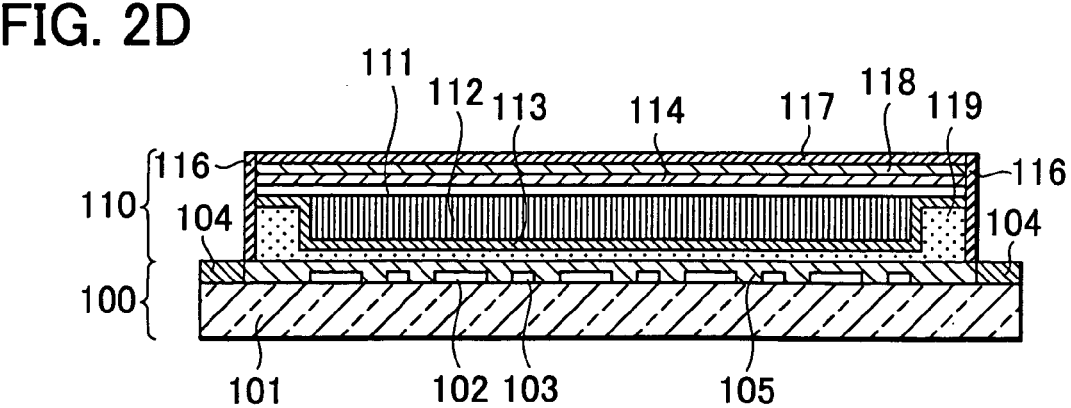

The scintillator panel 110 is bonded to the sensor panel 100 with an adhesive layer 119, followed by sealing with a sealing resin 116, as shown in FIG. 2D.

The substrate 117 of this radiation detecting apparatus is formed of a material commonly used as the phosphor panel substrate of a radiation detecting apparatus. Exemplary substrates include Al, glass fused quartz, and amorphous carbon substrates, an amorphous carbon-containing substrate, and a heat-resistant resin substrate, such as that of polyimide or polybenzoimidazole. Amorphous carbon is particularly suitable for the substrate because it absorbs X-rays less than and transmits X-rays more than glass and Al.

Third Embodiment

Figure 3:
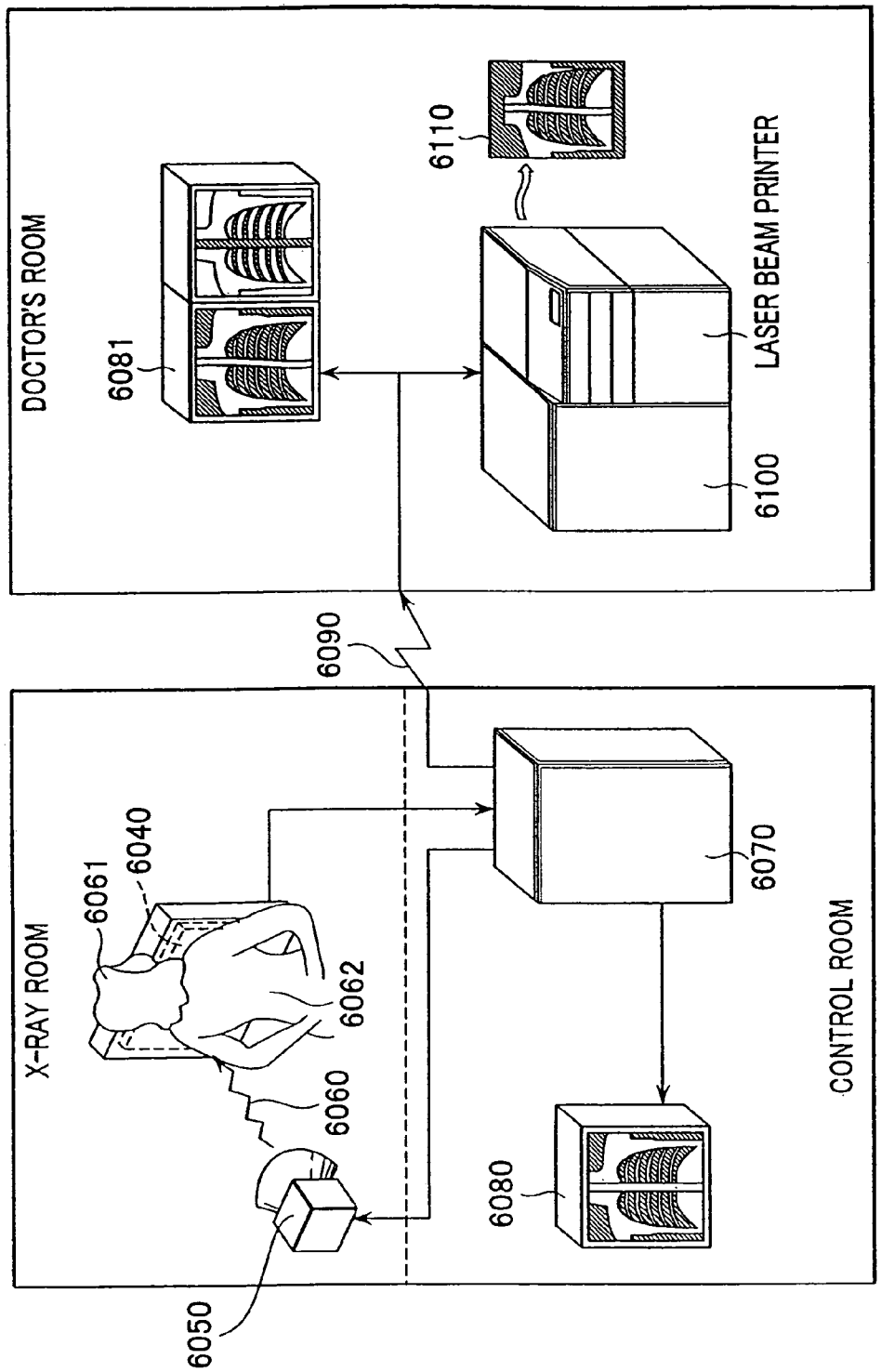
FIG. 3 is a diagram illustrating a radiodiagnosis system using a radiation detecting apparatus according to the present invention.

FIG. 3 is a representation of a radiodiagnosis system using a radiation detecting apparatus, according to a third embodiment of the present invention.

X-rays 6060 generated from an x-ray tube 6050 pass through the chest 6062 of a test subject 6061, and enter a radiation detecting apparatus 6040 as shown in FIGS. 2A to 2D. The incoming X-rays include in-vivo information of the subject 6061. The phosphor layer emits light according to the incoming X-rays. The light is converted into electrical signals in the photoelectric conversion devices of the sensor panel and, thus, electrical information is obtained. This information is converted into digital information, and is subsequently processed into an image by an image processor 6070. The image is shown on a display 6080 in a control room.

The information can be transferred to a remote site through transmitting means, such as a telephone line 6090. Thus, the information can be shown on a display 6081 in a doctor's room apart from the control room or stored in recording means, such as an optical disk, which allows a remote doctor to diagnose the information. The information may be recorded on a film 6110 with a film processor 6100 or other recording means.

The present invention can be applied to a medical X-ray sensor, as described above, and can also be used in other applications, such as nondestructive test.

EXAMPLES

The radiation detecting apparatus of the present invention will be further described according to the following examples.

As shown in FIG. 1A, photoelectric conversion devices 102, each including a photosensor and a TFT, and wires 103 were formed on an amorphous silicon semiconductor layer on a glass substrate 101. Then, a SiN passivation layer 105 was provided over photoelectric conversion devices 102. Thus, a sensor panel 100 was prepared. A polyimide underlayer 111 was then formed on the passivation layer 105.

The underlayer 111 on the sensor panel 100 was surface-treated by atmospheric pressure plasma treatment under the conditions shown in Table 1. Then, an alkali halide columnar crystalline phosphor was vapor-deposited to form a phosphor layer 112 on the surface of the underlayer 111, as shown in FIGS. 1B and 1C. P-xylene moisture-resistant protective layer 113 was formed by CVD so as to cover the entire top and side surfaces of the phosphor layer 112. Al was vapor-deposited to a reflection layer 114 and another p-xylene protective layer 115 was formed so as to cover the entire reflection layer 114. Finally, a sealing resin 116 was applied so as to cover the ends of the protective layers, thus, completing a radiation detecting apparatus.

In Examples 1 to 5, each phosphor layer 112 was precisely formed, accordingly resulting in a radiation detecting apparatus with high uniformity.

The resulting radiation detecting apparatuses were allowed to stand in a temperature-humidity test bath of 60° C. in temperature and 90% in humidity for 1,000 hours. The results are shown in Table 1. In Examples 1 to 3, atmospheric pressure plasma treatment was applied under different conditions. In Examples 4 and 5, the underlayer was formed of benzocyclobutene and an acrylic resin, respectively, instead of polyimide.

TABLE 1

|  | Example 1 | Example 2 | Example 3 | Example 4 | Example 5 | Comparative example 1 | Comparative example 2 | Comparative example 3 | Comparative example 4 |
|---|---|---|---|---|---|---|---|---|---|
| Underlayer | Polyimide Thickness: 5 μm Curing temperature: 230° C. 3 h | | | Benzocyclobutene Thickness: 5 μm Curing temperature: 250° C. 4 h | | Polyimide Thickness: 5 μm Curing temperature: 240° C. 3 h | | | |
| Nozzle speed | 30 mm/sec | 75 mm/sec | 140 mm/sec | 75 mm/sec | 140 mm/sec | — | 5 mm/sec | 75 mm/sec | 180 mm/sec |
| Surface-treated region | Entire surface | Entire surface | Entire surface | Entire surface | Entire surface | — | Entire surface | Within 10 mm from edges | Entire surface |
| Peeling of phosphor | No | No | No | No | No | Yes | — | No | Yes |
| Defect in sensor panel | No | No | No | No | No | No | Yes | No | No |
| Optical output | 1.2 | 1.2 | 1.2 | 1.3 | 1.2 | 1 | — | 1 | 1 |

1. Peeling of the Phosphor Layer

After the endurance test at a temperature of 60° C. and a humidity of 90% for 1,000 hours, the radiation detecting apparatus were exposed to X-rays to form radiographic images. Using the radiographic images, it was observed whether there was any defect in the phosphor layer, such as peeling or fracture.

2. Optical Output

Optical output was evaluated with radiographs taken by exposing a water phantom of 100 mm in thickness to X rays with a tube voltage of 100 kV. The values shown in the table represent sensitivities relative to the sensitivity of Comparative Example 1.

3. Defect in the Sensor Panel

After plasma treatment, it was examined whether there was any defect, such as a broken wire or nonuniform noise, in the sensor panel.

As described above, the present invention produces the following effects:

(1) A scintillator panel and a radiation detecting apparatus which have a phosphor layer constituted of uniformly shaped crystals and exhibit uniform sensitivity.

(2) The phosphor layer of the resulting scintillator panel or a radiation detecting apparatus does not peel or fracture and, thus, particularly the temperature-humidity resistance is enhanced.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for manufacturing a radiation detecting apparatus including a sensor panel having two-dimensionally arranged photoelectric conversion devices and wires, and an underlayer provided over the sensor panel so as to cover the photoelectric conversion devices and the wires, and a phosphor layer disposed on the underlayer, wherein the phosphor layer converts a radiation into light capable of being sensed by the photoelectric conversion devices, the method comprising the steps of:

applying an atmospheric pressure plasma treatment to a surface of the underlayer provided over the photoelectric conversion devices and the wires, wherein the atmospheric pressure plasma treatment is performed at a power output of 0.9 kW and a speed in the range of 30 to 120 mm/s; and forming the phosphor layer on the surface of the underlayer, wherein the step of forming the phosphor layer is performed by vapor deposition on the surface of the underlayer, and wherein the phosphor layer has columnar crystals.

2. A method according to claim 1, further comprising the step of covering the phosphor layer with a moisture-resistant protective layer.

3. A method according to claim 2, wherein the moisture-resistant protective layer comprises an organic film.

4. A method according to claim 1, wherein the underlayer comprises a highly heat-resistant resin.

5. A method according to claim 1, wherein the underlayer comprises a polyimide.

6. A method according to claim 1, wherein the step of forming the phosphor layer is performed by vapor-depositing an activator-added alkali halide.

* * * * *